(12) United States Patent
Nagel et al.

(10) Patent No.: US 10,614,595 B2
(45) Date of Patent: Apr. 7, 2020

(54) ASSIGNING TEXTURES TO GRAPHICAL KEYBOARDS BASED ON THEMATIC TEXTURES OF APPLICATIONS

(71) Applicant: GOOGLE LLC, Mountain View, CA (US)

(72) Inventors: Jens Nagel, Sunnyvale, CA (US); Song Fu, Beijing (CN)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 15/102,397

(22) PCT Filed: Apr. 20, 2016

(86) PCT No.: PCT/CN2016/079720
§ 371 (c)(1),
(2) Date: Jun. 7, 2016

(87) PCT Pub. No.: WO2017/181356
PCT Pub. Date: Oct. 26, 2017

(65) Prior Publication Data
US 2019/0035115 A1    Jan. 31, 2019

(51) Int. Cl.
| | | |
|---|---|---|
| G06T 11/00 | (2006.01) | |
| G06F 3/0488 | (2013.01) | |
| G06F 3/14 | (2006.01) | |
| G06F 3/048 | (2013.01) | |

(52) U.S. Cl.
CPC ............ *G06T 11/001* (2013.01); *G06F 3/048* (2013.01); *G06F 3/04886* (2013.01); *G06F 3/1454* (2013.01); *G06T 2200/24* (2013.01)

(58) Field of Classification Search
CPC ... G06F 3/04886; G06F 3/1454; G06T 11/001
See application file for complete search history.

(56) References Cited

U.S. PATENT DOCUMENTS

| | | | |
|---|---|---|---|
| 2006/0033724 A1* | 2/2006 | Chaudhri | ............ G06F 3/0482 345/173 |
| 2013/0239041 A1 | 9/2013 | DaCosta | |
| 2013/0249818 A1 | 9/2013 | Zhai et al. | |

(Continued)

FOREIGN PATENT DOCUMENTS

| | | |
|---|---|---|
| CN | 102622161 A | 8/2012 |
| CN | 103677640 A | 3/2014 |

(Continued)

OTHER PUBLICATIONS

CN-103677640A (Machine Translation on Dec. 7, 2018) (Year: 2014).*

(Continued)

*Primary Examiner* — Michael Le
(74) *Attorney, Agent, or Firm* — Shumaker & Sieffert, P.A.

(57) ABSTRACT

A computing device is described that determines, by executing a first application, a thematic texture of a second application separate from the first application. Additionally, the computing device determines, by executing the first application and based at least in part on the thematic texture of the second application, a texture. The computing device assigns, by executing the first application, the determined texture to a region of a graphical keyboard.

15 Claims, 7 Drawing Sheets

(56) References Cited

U.S. PATENT DOCUMENTS

| | | | | |
|---|---|---|---|---|
| 2015/0070281 A1* | 3/2015 | Melmon | ................ | G06F 3/039 |
| | | | | 345/168 |
| 2016/0103608 A1* | 4/2016 | Nukala | ................ | G06F 17/211 |
| | | | | 345/419 |
| 2017/0017393 A1* | 1/2017 | Luo | .................... | G06F 3/04886 |

FOREIGN PATENT DOCUMENTS

| | | |
|---|---|---|
| CN | 104049842 A | 9/2014 |
| CN | 104978198 A | 10/2015 |

OTHER PUBLICATIONS

CN-104978198A (Machine Translation on Dec. 7, 2018) (Year: 2015).*

International Search Report and Written Opinion of International Application No. PCT/CN2016/079720, dated Jan. 24, 2017, 14 pp.

Extended Search Report from counterpart European Application No. 16898944.0, dated Nov. 7, 2018, 10 pp.

* cited by examiner

ASSIGNING TEXTURES TO GRAPHICAL KEYBOARDS BASED ON THEMATIC TEXTURES OF APPLICATIONS

BACKGROUND

Graphical keyboards have proliferated with the increased use of mobile devices having presence-sensitive displays. Such graphical keyboards typically include graphical keys corresponding to symbols, such as letters, numbers, punctuation marks, and commands.

SUMMARY

In one example, this disclosure describes a method includes determining, by a computing device executing a first application, a thematic texture of a second application separate from the first application; determining, by the computing device executing the first application and based at least in part on the thematic texture of the second application, a texture; and assigning, by the computing device executing the first application, the determined texture to a region of a graphical keyboard.

In another example, this disclosure describes a computing device comprises a presence-sensitive display; at least one processor; and a memory comprising instructions of a first application that, when executed by the at least one processor, cause the at least one processor to: determine a thematic texture of a second application separate from the first application; determine, based at least in part on the thematic texture of the second application, a texture; assign the determined texture to a region of a graphical keyboard.

In another example, this disclosure describes a computer-readable storage medium encoded with instructions of a first application that, when executed by at least one processor of a computing device, cause the at least one processor to: determine a thematic texture of a second application separate from the first application; determine, based at least in part on the thematic texture of the second application, a texture; assign the determined texture to a region of a graphical keyboard; and output, for concurrent display at a presence-sensitive display, the graphical keyboard and a graphical user interface of the second application.

The details of one or more examples are set forth in the accompanying drawings and the description below. Other features, objects, and advantages of the disclosure will be apparent from the description and drawings, and from the claims.

DETAILED DESCRIPTION

Figure 1:
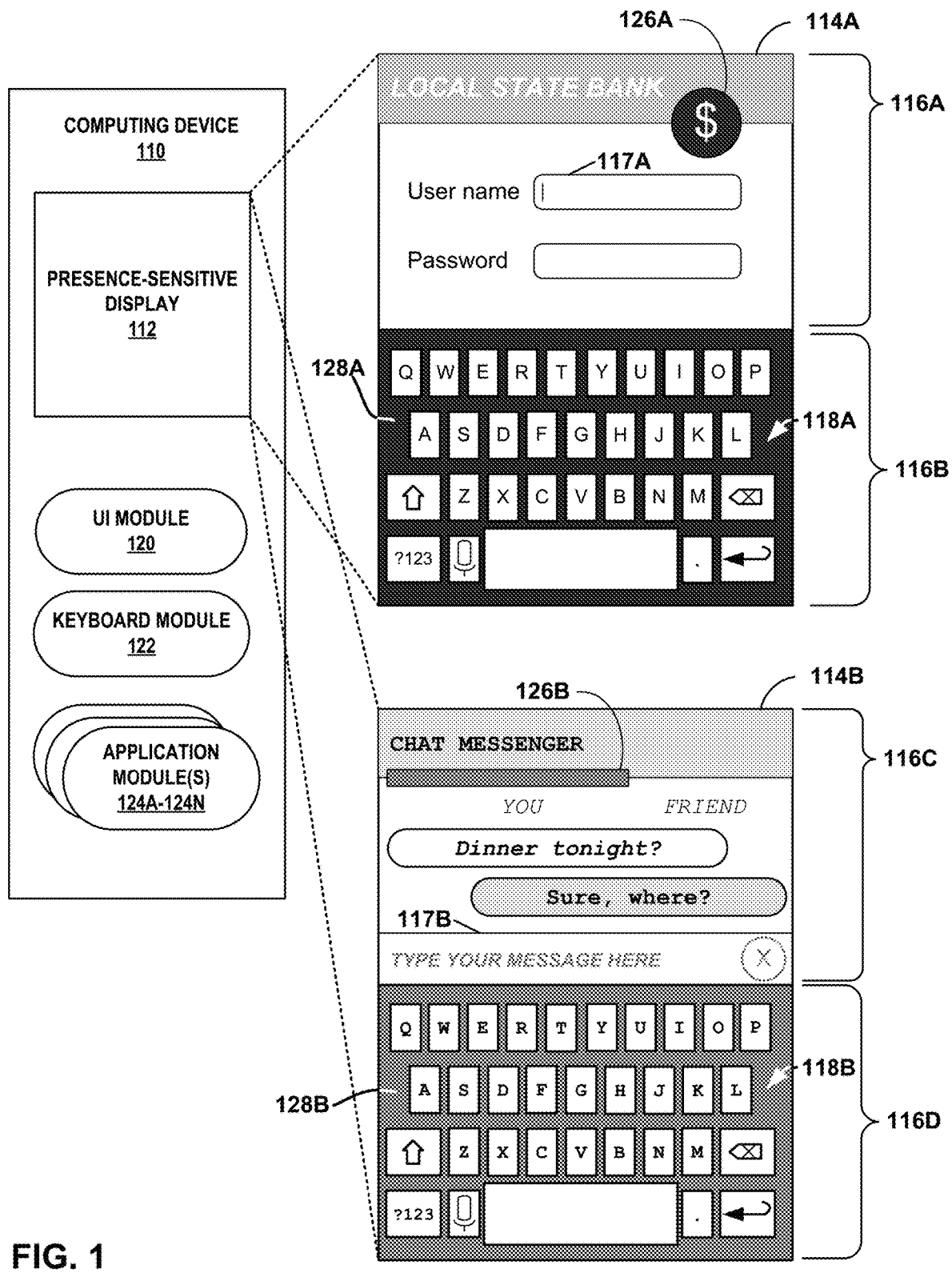
FIG. 1 is a conceptual diagram illustrating an example computing device that is configured to present at least one graphical keyboard, in accordance with one or more aspects of the present disclosure.

In general, this disclosure is directed to techniques for efficient use of storage and processing resources of a computing device while enabling the computing device to adapt textures in graphical keyboards based at least in part on thematic textures of applications whose user interfaces may, in certain examples, be displayed concurrently with the graphical keyboards. Different applications may be associated with different thematic textures. As used in this disclosure, a texture may be a single color, color gradient, a pattern of colors, or an image. In some examples, a thematic texture of an application is used in a graphical user interface of the application for visual emphasis. Also, as used in this disclosure, a thematic texture of an application means the specific texture(s) of one or more regions of instances of an application's graphical user interface as presented on the display of a computing device. In accordance with an example technique of this disclosure, the computing device may reuse the same software to determine thematic textures of applications, determine textures based at least in part on thematic textures of different applications, and assign the textures to one or more regions of graphical keyboards to be displayed with graphical user interfaces of the applications. For example, the computing device may use a first application (e.g., a keyboard application) to assign, based at least in part on a thematic texture of a second application separate from the first application), a particular texture to a particular region of a first graphical keyboard when that first graphical keyboard is displayed in conjunction with a graphical user interface for the second application. In this example, the computing device may reuse the same first application to assign, based at least in part on a thematic texture of a third application different from the first and second applications, a different texture to a particular region of a second graphical keyboard, again when that second graphical keyboard is displayed in conjunction with a graphical user interface for the third application.

Throughout the disclosure, examples are described where a computing device and/or a computing system analyzes information (e.g., context, locations, speeds, search queries) associated with a computing device and a user of a computing device, only if the computing device receives permission from the user of the computing device to analyze the information. For example, in situations discussed below, before a computing device or computing system can collect or may make use of information associated with a user, the user may be provided with an opportunity to provide input to control whether programs or features of the computing device and/or computing system can collect and make use of user information (e.g., information about a user's current location, current speed), or to dictate whether and/or how to the device and/or system may receive content that may be relevant to the user. In addition, certain data may be treated in one or more ways before it is stored or used by the computing device and/or computing system, so that personally identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device and computing system.

FIG. 1 is a conceptual diagram illustrating an example computing device 110 that is configured to present at least one graphical keyboard, in accordance with one or more aspects of the present disclosure. Computing device 110 may represent a mobile device, such as a smart phone, a tablet computer, a laptop computer, computerized watch, or any other types of wearable and non-wearable, mobile or non-mobile computing devices that may output a graphical keyboard for display.

Computing device 110 includes a presence-sensitive display (PSD) 112, user interface (UI) module 120, keyboard module 122, and a plurality of application modules 124A-124N (collectively, "application modules 124"). Modules 120, 122, and 124 may perform operations described using software, hardware, firmware, or a mixture of hardware, software, and firmware residing in and/or executing at computing device 110. One or more processors of computing device 110 may execute instructions that are stored at a memory or other non-transitory storage medium of computing device 110 to perform the operations of modules 120, 122, and 124. Computing device 110 may execute modules 120, 122, and 124 as or within virtual machines executing on underlying hardware. Modules 120, 122, and 124 may execute as one or more services of an operating system or computing platform. Modules 120, 122, and 124 may execute as one or more executable programs at an application layer of a computing platform.

PSD 112 of computing device 110 may function as respective input and/or output devices for computing device 110. PSD 112 may be implemented using various technologies. For instance, PSD 112 may function as input devices using presence-sensitive input screens, such as resistive touchscreens, surface acoustic wave touchscreens, capacitive touchscreens, projective capacitance touchscreens, pressure-sensitive screens, acoustic pulse recognition touchscreens, or another presence-sensitive display technology. PSD 112 may also function as an output (e.g., display) device using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of computing device 110.

PSD 112 may output information to a user in the form of a graphical user interface, which may be associated with functionality provided by computing device 110. For instance, in the example of FIG. 1, PSD 112 outputs, at different times, a user interface 114A and a user interface 114B. Such user interfaces may be associated with one or more computing platforms, operating systems, applications, and/or services executing at or accessible from computing device 110 (e.g., electronic message applications, chat applications, Internet browser applications, mobile or desktop operating systems, social media applications, electronic games, and other types of applications). Additionally, PSD 112 may detect input (e.g., touch and non-touch input) from a user of respective computing device 110. PSD 112 may detect indications of input by detecting one or more gestures from a user (e.g., the user touching, pointing, and/or swiping at or near one or more locations of PSD 112 with a finger or a stylus pen).

UI module 120 manages user interactions with PSD 112 and other components of computing device 110. In other words, UI module 120 may act as an intermediary between various components of computing device 110 to make determinations based on user input detected by PSD 112 and may generate output at PSD 112 in response to the user input. UI module 120 may receive instructions from an application, service, platform, or other module of computing device 110 to cause PSD 112 to output a user interface (e.g., user interface 114A, 114B). UI module 120 may manage inputs received by computing device 110 as a user views and interacts with the user interface presented at PSD 112 and may update the user interface in response to receiving additional instructions from the application, service, platform, or other module of computing device 110 that is processing the user input.

Keyboard module 122 represents an application, service, or component executing at or accessible to computing device 110 that provides computing device 110 with a graphical keyboard. Hence, keyboard module 122 may be an instance of a keyboard application, which may be referred to this this disclosure as a "first application." The graphical keyboard includes graphical elements displayed as graphical keys. Keyboard module 122 may output information to UI module 120 that specifies the layout of the graphical keyboard and, in some examples, texture assigned to regions of the graphical keyboard. For example, the information may include instructions that specify locations, sizes, colors, and other characteristics of the graphical keys. Based on the information received from keyboard module 122, UI module 120 may cause PSD 112 display the graphical keyboard as part of a user interface.

In the example of FIG. 1, user interface 114A includes a graphical user interface 116A generated by a second application and also includes a graphical keyboard 116B generated by keyboard module 122 (separate from the second application). User interface 114B includes a graphical user interface 116C generated by a third application (separate from the first application (e.g., keyboard module 122) and the second application) and also includes a graphical keyboard 116D generated by keyboard module 122. Thus, in accordance with the techniques of this disclosure, the same software (e.g., keyboard module 122) may be reused to generate graphical keyboards for use with graphical user interfaces of different applications. Graphical keyboard 116B includes a set of graphical keys 118A and a background region 128A surrounding graphical keys 118A. Graphical keyboard 116D includes a set of graphical keys 118B and a background region 128B surrounding graphical keys 118B. Furthermore, in the example of FIG. 1, graphical user interface 116A includes an edit region 117A for inputting a user name. Graphical user interface 116C includes an edit region 117B for inputting a message or for inputting a search query that computing device 110 executes from within graphical keyboard 116D.

Each graphical key of a graphical keyboard may be associated with a respective symbol (e.g., a letter, number, punctuation mark, glyph, space, emoji, or other character) displayed, e.g., within the key. A user of computing device 110 may provide input at locations of PSD 112 at which one or more of the graphical keys is displayed to input content (e.g., characters) into an edit region (e.g., edit regions 117A, 117B). Keyboard module 122 may receive information from UI module 120 indicating locations associated with input detected by PSD 112 that are relative to the locations of each of the graphical keys. Keyboard module 122 may use a spatial and/or language model to translate the inputs to selections of keys and characters, words, and/or phrases.

For example, PSD 112 may detect an indication of a user input as a user of computing device 110 provides user inputs at or near a location of PSD 112 where PSD 112 presents graphical keys. UI module 120 may receive, from PSD 112, an indication of the user input at PSD 112 and output, to keyboard module 122, information about the user input. Information about the user input may include an indication of one or more touch events (e.g., locations and other information about the input) detected by PSD 112.

Based on the information received from UI module 120, keyboard module 122 may map detected inputs at PSD 112 to selections of graphical keys, determine characters based on selected graphical keys, and predict or autocorrect words and/or phrases determined based on the characters associated with the selected graphical keys. For example, keyboard module 122 may include a spatial model that determines, based on the locations of graphical keys and the information about the input, the most likely one or more graphical keys being selected. Responsive to determining the most likely one or more graphical keys being selected, keyboard module 122 may determine one or more characters, words, and/or phrases. For example, each of the one or more graphical keys being selected from a user input at PSD 112 may represent an individual character or a keyboard operation. Keyboard module 122 may determine a sequence of characters selected based on the one or more selected graphical keys. In some examples, keyboard module 122 may apply a language model to the sequence of characters to determine one or more the most likely candidate letters, morphemes, words, and/or phrases that a user is trying to input based on the selection of graphical keys.

Keyboard module 122 may send the sequence of characters and/or candidate words and phrases to UI module 120, and UI module 120 may cause PSD 112 to present the characters and/or candidate words determined from a selection of one or more graphical keys as text within an edit region, such as edit region 117A or edit region 117B. In some examples, when functioning as a traditional keyboard for performing text-entry operations, and in response to receiving a user input at graphical keys (e.g., as a user is typing at graphical keyboard to enter text within an edit region), keyboard module 122 may cause UI module 120 to display the candidate words and/or phrases as one or more selectable spelling corrections and/or selectable word or phrase suggestions within a suggestion region.

In some examples, keyboard module 122 may be a stand-alone application, service, or module executing at computing device 110 and in other examples, keyboard module 122 may be a sub-component thereof. For example, keyboard module 122 may be a stand-alone application or subroutine that is invoked by an application or operating platform of computing device 110 any time an application or operating platform requires graphical keyboard input functionality. In some examples, computing device 110 may download and install keyboard module 122 from an application repository of a service provider (e.g., via the Internet). In other examples, keyboard module 122 may be an integral part of the device operating system, and may be preloaded during production of computing device 110.

In the example of FIG. 1, computing device 110 outputs user interface 114A in response to a first application invoking keyboard module 122 and outputs user interface 114B in response to a second application invoking keyboard module 122. The first application and the second application may correspond to different ones of application modules 124. In the non-limiting example of FIG. 1, the first application is a banking application and the second application is an interpersonal messaging application. However, in other examples, other types of applications may be used.

Applications may be associated with respective thematic textures. In some examples, the thematic texture of an application is used in a graphical user interface of the application for floating action buttons and interactive elements, such as text fields and cursors, text selection, progress bars, selection controls, button, and sliders, links, and other points of visual emphasis or interaction. In addition, the thematic texture of an application may include the background, frame, and/or visual highlights of the graphical user interface of the application. In the example of FIG. 1, graphical user interface 116A includes element 126A that has been assigned a thematic texture of the first application. Furthermore, in the example of FIG. 1, graphical user interface 116C includes element 126B that has been assigned the thematic texture of the second application. In some examples, keyboard module 122 determines thematic textures for applications based on textures of elements, such as elements 126A, 126B, in graphical user interfaces of the applications. For instance, keyboard module 122 may analyze the graphical user interfaces of applications to identify prominent textures in the graphical user interfaces and use the identified textures as the thematic textures of the applications. In other examples, elements, such as elements 126A, 126B, in graphical user interfaces of applications may have particular textures because such textures are specified as prominent textures in files associated with the applications. For instance, when an application is generating a graphical user interface for the application, the application may read data from the file to determine which texture to assign to a particular feature. Keyboard module 122 may determine the thematic textures of applications based on the same data in the files associated with the applications.

In accordance with particular techniques of this disclosure, keyboard module 122 may determine, based at least in part of a thematic texture of an application, a texture to assign to a region of a graphical keyboard. For example, when a device, such as an output device, renders the graphical keyboard for display, the device may cause pixels corresponding to a region to which a texture has been assigned to have colors of the texture. Thus, when an output device renders the graphical keyboard for display, the colors of pixels corresponding to at least the region of the graphical keyboard may be set based on the thematic texture of the application. For example, when the thematic texture of the application consists of a single particular color value (such as for the background of the application's user interface), keyboard module 122 may assign the same particular color value to a region of the graphical keyboard (again, such as the background of the keyboard's user interface). If, for instance, the thematic texture of the application is a particular shade of blue, keyboard module 122 may assign the particular shade of blue to a region of the graphical keyboard. In other examples, when the thematic texture of the application is a pattern of color values, keyboard module 122 may assign the pattern of color values to the region of the graphical keyboard. For instance, if the thematic texture of the application is a pattern resembling paper, keyboard module 122 may assign the pattern to a region of the graphical keyboard such that the region of the graphical keyboard has a matching paper-like pattern. In some examples, the texture assigned to the region of the graphical keyboard is based at least in part on, but is not the same as, the thematic texture of the application, such as when there would be insufficient contrast between the thematic texture of the application and color value(s) of other regions of the graphical keyboard. In some examples, keyboard module 122 does not assign a texture to all regions of the graphical keyboard based on the thematic texture of the application. In further examples, a region of the graphical keyboard's user interface corresponding to a region of the application's user interface is assigned a same or similar thematic texture as that of the corresponding region of the application's user interface. That is, thematic texture may be assigned on a region-by-region basis.

As indicated above, different applications may be associated with different thematic textures. Thus, keyboard module 122 may assign, based on the different thematic textures of the different applications, different textures to regions of different graphical keyboards. For instance, in the example of FIG. 1, if the thematic texture of the first application is a particular shade of blue, keyboard module 122 may assign the particular shade of blue to a region (e.g., background region 128A) of graphical keyboard 116B. If the thematic texture of the second application is a particular shade of red, keyboard module 122 may assign the particular shade of red to a region (e.g., background region 128B) of graphical keyboard 116D.

In different examples, keyboard module 122 may assign a determined texture to different regions of a graphical keyboard. For instance, keyboard module 122 may determine, based at least in part on a thematic texture of an application, a texture and assign the determined texture to a background region (e.g., background region 128A, 128B) of the graphical keyboard. In another example, each graphical key of the graphical keyboard comprises a symbol portion and a non-symbol portion. The symbol portion of a graphical key is colored to indicate the symbol included in the graphical key. For instance, in the example of FIG. 1, the symbol portions of graphical keys 118A, 118B are colored black and the non-symbol portions of graphical keys 118A, 118B are colored white. In this example, keyboard module 122 may assign the determined texture to the non-symbol portions of one or more of the graphical keys. In another example, keyboard module 122 may assign, based at least in part on a thematic texture of an application, the determined texture to the symbol portions of one or more of the graphical keys.

In some examples, border markers in the graphical keyboard enclose or otherwise visually separate some or all graphical keys of the graphical keyboard. For instance, in the example of FIG. 1, the black boxes enclosing the graphical keys 118A, 118B are the border markers. In other examples, the border markers may comprise vertical bars between symbols included the graphical keys. In such examples, the border markers may include corresponding horizontal bars between graphical keys. In some examples, keyboard module 122 assigns the determined texture to the border markers.

When keyboard module 122 assigns a texture to a region of a graphical keyboard, keyboard module 122 may simply set a texture of the region equal to the thematic texture. In other examples, when keyboard module 122 assigns a texture to a region of a graphical keyboard, keyboard module 122 may modify one or more color values of a thematic texture based on one or more factors to determine the texture assigned to the region. Such factors may include a contrast metric relative to color values of other regions of the graphical keyboard, modifications to achieve anti-aliasing or overly abrupt color changes, transparency, and so on.

The techniques of this disclosure may address one or more technical problems. For example, by determining a texture based at least in part on a thematic texture of an application and assigning the determined texture to a region of a graphical keyboard displayed with a graphical user interface to the application, the graphical keyboard may incorporate more of the look-and-feel of the application. It may therefore appear that the graphical keyboard is an integrated part of the application. In previous approaches, different applications may need to include separate keyboard-implementing software in order to provide for graphical keyboards that appear to be integrated parts of the applications. However, particular techniques of this disclosure provide for reusing the same software, such as keyboard module 122, to assign textures to regions in different graphical keyboards. Hence, in various examples, such techniques may spare the applications from needing to include separate keyboard-implementing software. Not needing to store separate keyboard-implementing software for multiple applications may conserve potentially scarce storage space on computing devices, while still allowing the applications to have graphical keyboards that appear to be integrated parts of the applications. In this way, certain techniques of this disclosure may allow an increase in the efficiency of use of storage space on computing devices. Furthermore, in certain examples, because instructions of the shared software may remain in a quick-access cache for frequent use with multiple applications, computing device 110 may be able to more quickly execute the instructions to generate the graphical keyboards.

In some examples, keyboard module 122 performs a process similar to that described in this disclosure with regard to the thematic texture of an application, but with regard to a thematic font, thematic font style, thematic font size, and/or thematic font color. Keyboard module 122 may determine a thematic font, thematic font style, thematic font size, and/or thematic font color for an application. In some examples, keyboard module 122 may determine the thematic font, thematic font style, thematic font size, and/or thematic font color based on data in a file associated with the application, such as a manifest file or a style sheet file. Text in a user interface of the application may be formatted according to the thematic font, thematic font style, thematic font size, and/or thematic font color. Keyboard module 122 may determine, based at least in part on the thematic font, font style, font size, and/or font color for the application, a keyboard font, keyboard font style, keyboard font size, and/or keyboard font color. Keyboard module 122 may assign the determined keyboard font, keyboard font style, keyboard font size, and/or keyboard font color to some or all text in a graphical keyboard (e.g., graphical keyboard 116B, 116D). In this way, when the application's graphical user interface is displayed concurrent with the graphical keyboard, some or all text in the graphical keyboard has the determined keyboard font, keyboard font style, keyboard font size, and/or keyboard font color. Assigning keyboard font, keyboard font style, keyboard font size, and/or keyboard font color in this way may have similar effects of increasing consistency of the graphical keyboard with a look and feel of an application without requiring applications to re-implement software for the graphical keyboard.

For instance, in the example of FIG. 1, a thematic font of text in a title bar of graphical interface 116A is an Arial font and a thematic font of text in a title bar of graphical interface 116C is a boldface Courier font. Accordingly, text in graphical keys 118A of graphical keyboard 116B are in the Arial font and text in graphical keys 118B if graphical keyboard 116D are in the boldface Courier font.

Figure 2:
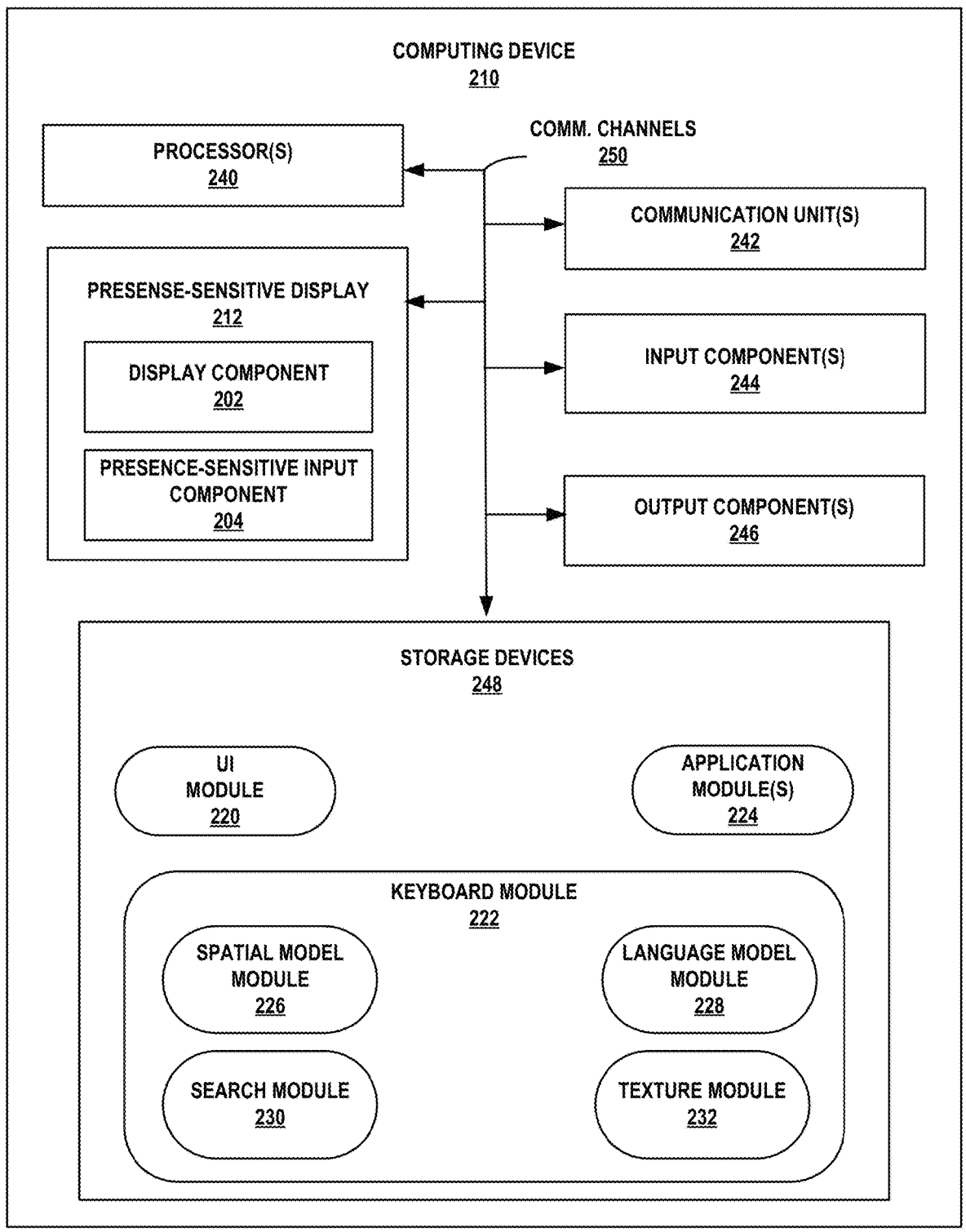
FIG. 2 is a block diagram illustrating an example computing device that is configured to present at least one graphical keyboard with integrated search features, in accordance with one or more aspects of the present disclosure.

FIG. 2 is a block diagram illustrating computing device 210 as an example computing device that is configured to present at least one graphical keyboard, in accordance with one or more aspects of the present disclosure. Computing device 210 of FIG. 2 is described below as an example of computing device 110 of FIG. 1. FIG. 2 illustrates only one particular example of computing device 210, and many other examples of computing device 210 may be used in other instances and may include a subset of the components included in example computing device 210 or may include additional components not shown in FIG. 2.

As shown in the example of FIG. 2, computing device 210 includes PSD 212, one or more processors 240, one or more communication units 242, one or more input components 244, one or more output components 246, and one or more storage components 248. Presence-sensitive display 212 includes display component 202 and presence-sensitive input component 204. Storage components 248 of computing device 210 include UI module 220, keyboard module 222, and one or more application modules 224. Keyboard module 122 may include spatial model ("SM") module 226, language model ("LM") module 228, search module 230 and texture module 232. Communication channels 250 may interconnect each of the components 212, 240, 242, 244, 246, 248, 220, 222, 224, 226, 228, 230, and 232 for inter-component communications (physically, communicatively, and/or operatively). In some examples, communication channels 250 may include a system bus, a network connection, an inter-process communication data structure, or any other method for communicating data.

One or more communication units 242 of computing device 210 may communicate with external devices via one or more wired and/or wireless networks by transmitting and/or receiving network signals on the one or more networks. Examples of communication units 242 include a network interface card (e.g. such as an Ethernet card), an optical transceiver, a radio frequency transceiver, a GPS receiver, or any other type of device that can send and/or receive information. Other examples of communication units 242 may include short wave radios, cellular data radios, wireless network radios, as well as universal serial bus (USB) controllers.

One or more input components 244 of computing device 210 may receive input. Examples of input are tactile, audio, and video input. Input components 244 of computing device 210, in one example, includes a presence-sensitive input device (e.g., a touch sensitive screen, a PSD), mouse, keyboard, voice responsive system, video camera, microphone or any other type of device for detecting input from a human or machine. In some examples, input components 244 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, camera, infrared proximity sensor, hygrometer, and the like). Other sensors may include a heart rate sensor, magnetometer, glucose sensor, hygrometer sensor, olfactory sensor, compass sensor, step counter sensor, to name a few other non-limiting examples.

One or more output components 246 of computing device 110 may generate output. Examples of output are tactile, audio, and video output. Output components 246 of computing device 210, in one example, includes a PSD, sound card, video graphics adapter card, speaker, cathode ray tube (CRT) monitor, liquid crystal display (LCD), or any other type of device for generating output to a human or machine.

PSD 212 of computing device 210 is similar to PSD 112 of computing device 110 and includes display component 202 and presence-sensitive input component 204. Display component 202 may be a screen at which information is displayed by PSD 212 and presence-sensitive input component 204 may detect an object at and/or near display component 202. As one example range, presence-sensitive input component 204 may detect an object, such as a finger or stylus that is within two inches or less of display component 202. Presence-sensitive input component 204 may determine a location (e.g., an [x, y] coordinate) of display component 202 at which the object was detected. In another example range, presence-sensitive input component 204 may detect an object six inches or less from display component 202 and other ranges are also possible. Presence-sensitive input component 204 may determine the location of display component 202 selected by a user's finger using capacitive, inductive, and/or optical recognition techniques. In some examples, presence-sensitive input component 204 also provides output to a user using tactile, audio, or video stimuli as described with respect to display component 202. In the example of FIG. 2, PSD 212 may present a user interface (such as graphical user interface 114 of FIG. 1).

While illustrated as an internal component of computing device 210, PSD 212 may also represent and an external component that shares a data path with computing device 210 for transmitting and/or receiving input and output. For instance, in one example, PSD 212 represents a built-in component of computing device 210 located within and physically connected to the external packaging of computing device 210 (e.g., a screen on a mobile phone). In another example, PSD 212 represents an external component of computing device 210 located outside and physically separated from the packaging or housing of computing device 210 (e.g., a monitor, a projector, etc. that shares a wired and/or wireless data path with computing device 210).

PSD 212 of computing device 210 may detect two-dimensional and/or three-dimensional gestures as input from a user of computing device 210. For instance, a sensor of PSD 212 may detect a user's movement (e.g., moving a hand, an arm, a pen, a stylus, etc.) within a threshold distance of the sensor of PSD 212. PSD 212 may determine a two- or three-dimensional vector representation of the movement and correlate the vector representation to a gesture input (e.g., a hand-wave, a pinch, a clap, a pen stroke, etc.) that has multiple dimensions. In other words, PSD 212 can detect a multi-dimension gesture without requiring the user to gesture at or near a screen or surface at which PSD 212 outputs information for display. Instead, PSD 212 can detect a multi-dimensional gesture performed at or near a sensor which may or may not be located near the screen or surface at which PSD 212 outputs information for display.

One or more processors 240 may implement functionality and/or execute instructions associated with computing device 210. Examples of processors 240 include application processors, display controllers, auxiliary processors, one or more sensor hubs, and any other hardware configure to function as a processor, a processing unit, or a processing device. Modules 220, 222, 224, 226, 228, 230, and 232 may be operable by processors 240 to perform various actions, operations, or functions of computing device 210. For example, processors 240 of computing device 210 may retrieve and execute instructions stored by storage components 248 that cause processors 240 to perform the operations of modules 220, 222, 224, 226, 228, 230, and 232. The instructions, when executed by processors 240, may cause computing device 210 to store information within storage components 248.

One or more storage components 248 within computing device 210 may store information for processing during operation of computing device 210 (e.g., computing device 210 may store data accessed by modules 220, 222, 224, 226, 228, 230, and 232 during execution at computing device 210). In some examples, storage component 248 is a temporary memory, meaning that a primary purpose of storage component 248 is not long-term storage. Storage components 248 on computing device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include flash memories, or forms of electrically programmable memories (EPROM) or electrically erasable and programmable (EEPROM) memories. Storage components 248 may store program instructions and/or information (e.g., data) associated with modules 220, 222, 224, 226, 228, 230, and 232. Storage components 248 may include a memory configured to store data or other information associated with modules 220, 222, 224, 226, 228, 230, and 232.

UI module 220 may include all functionality of UI module 120 of computing device 110 of FIG. 1 and may perform similar operations as UI module 120 for managing a user interface (e.g., user interface 114) that computing device 210 provides at presence-sensitive display 212 for handling input from a user. For example, UI module 220 of computing device 210 may query keyboard module 222 for a keyboard layout (e.g., an English language QWERTY keyboard). UI module 220 may transmit a request for a keyboard layout over communication channels 250 to keyboard module 222. Keyboard module 222 may receive the request and reply to UI module 220 with data associated with the keyboard layout. UI module 220 may receive the keyboard layout data over communication channels 250 and use the data to generate a user interface. UI module 220 may transmit a display command and data over communication channels 250 to cause PSD 212 to present the user interface at PSD 212.

In some examples, UI module 220 may receive an indication of one or more user inputs detected at PSD 212 and may output information about the user inputs to keyboard module 222. For example, PSD 212 may detect a user input and send data about the user input to UI module 220. UI module 220 may generate one or more touch events based on the detected input. A touch event may include information that characterizes user input, such as a location component (e.g., [x,y] coordinates) of the user input, a time component (e.g., when the user input was received), a force component (e.g., an amount of pressure applied by the user input), or other data (e.g., speed, acceleration, direction, density, etc.) about the user input.

Based on location information of the touch events generated from the user input, UI module 220 may determine that the detected user input is associated the graphical keyboard. UI module 220 may send an indication of the one or more touch events to keyboard module 222 for further interpretation. Keyboard module 222 may determine, based on the touch events received from UI module 220, that the detected user input represents an initial selection of one or more keys of the graphical keyboard.

Application modules 224 represent all the various individual applications and services executing at and accessible from computing device 210 that may rely on a graphical keyboard having integrated search features. A user of computing device 210 may interact with a graphical user interface associated with one or more application modules 224 to cause computing device 210 to perform a function. Numerous examples of application modules 224 may exist and include, a fitness application, a calendar application, a personal assistant or prediction engine, a search application, a map or navigation application, a transportation service application (e.g., a bus or train tracking application), a social media application, a game application, an e-mail application, a chat or messaging application, an Internet browser application, or any and all other applications that may execute at computing device 210.

Keyboard module 222 may include all functionality of keyboard module 122 of computing device 110 of FIG. 1 and may perform similar operations as keyboard module 122 for providing a graphical keyboard having integrated search features. Keyboard module 222 may include various sub-modules, such as SM module 226, LM module 228, and search module 230, which may perform the functionality of keyboard module 222.

SM module 226 may receive one or more touch events as input, and output a character or sequence of characters that likely represents the one or more touch events, along with a degree of certainty or spatial model score indicative of how likely or with what accuracy the one or more characters define the touch events. In other words, SM module 226 may infer touch events as a selection of one or more keys of a keyboard and may output, based on the selection of the one or more keys, a character or sequence of characters.

When keyboard module 222 operates in text-entry mode or the search mode, LM module 228 may receive a character or sequence of characters as input, and output one or more candidate characters, words, or phrases that LM module 228 identifies from a lexicon as being potential replacements for a sequence of characters that LM module 228 receives as input for a given language context (e.g., a sentence in a written language). Keyboard module 222 may cause UI module 220 to present one or more of the candidate words at suggestion regions 118C of user interface 114.

Texture module 232 of keyboard module 222 may determine thematic textures of applications and may determine textures based on the thematic textures of the application. Additionally, texture module 232 may assign the determined textures to regions of graphical keyboards. For example, texture module 232 may determine, based at least in part on a thematic texture of a first application (e.g., a first one of application modules 224), a first texture. In this example, texture module 232 may assign the first texture to a region of a first graphical keyboard. Computing device 210 may output, for concurrent display at presence-sensitive display 212, the first graphical keyboard and a graphical user interface of the first application. Furthermore, texture module 232 may determine, based at least in part on a thematic texture of a second application (e.g., a second one of application modules 224), a second texture. In this example, texture module 232 may assign the second texture to a region of a second graphical keyboard. Thus, computing device 210 may execute the same software (e.g., texture module 232) to determine textures based on the thematic textures of the first and second applications and assign textures to regions in the first graphical keyboard and the second graphical keyboard. Computing device 210 may output, for concurrent display at presence-sensitive display 212, the second graphical keyboard and a graphical user interface of the second application. The first and second graphical keyboards may have the same layout of graphical keys. In some instances, the first and second graphical keyboards are identical other than differences in the textures assigned to the respective regions of the first and second graphical keyboards.

Texture module 232 may determine the thematic texture of an application in various ways. For example, texture module 232 may determine, based on data in a file associated with an application, the thematic texture of the application. For instance, in this example, respective applications may be associated with respective configuration files. In some examples, the configuration files may be referred to as manifest files. The configuration file of an application may present information regarding the application to other systems, such as an operating system or other applications or modules, of computing device 210. In this example, the configuration file of an application may specify the thematic texture of the application. The application may use the configuration file to determine textures to use in the graphical user interface of the application. For instance, when executing software of the application, computing device 210 may output, for display at presence-sensitive display 212 in the graphical user interface of the application and based at least in part on the data in the file indicating the thematic texture, an element (e.g., element 126A, 126B in FIG. 1) having the thematic texture. In some examples, texture module 232 may read data indicating the thematic texture of the application from the configuration file associated with the application. In some examples, texture module 232 determines the thematic texture of the application based on other data, such as a registry maintained by an operating system of computing device 210, generated in part based on data in the configuration file of the application.

In contrast to examples where the application executes locally on computing device 210, in other examples, the application may be a web application, such as a website. Software of a web application may run at least partially on a remote server. The remote server may send to a client device data, such as Hypertext Markup Language (HTML) data, that enable the client device to render a user interface (e.g., a web page) of the web application. In such examples, a currently displayed web page of the web application may be associated with a style sheet that specifies the thematic texture. The style sheet may be defined using a style sheet language, such as Cascading Style Sheets (CS S) or Extensible Stylesheet Language Transformations (XSLT). In this example, texture module 232 may read data from the style sheet to determine the thematic texture specified in the style sheet. Thus, texture module 232 may determine the thematic texture of a web application from a style sheet referenced by a web page of the web application. In other examples, texture module 232 determines the thematic texture of the application based on other data, such as data provided by a web browser application, generated at least in part based on data in the style sheet.

In different examples, texture module 232 may determine a thematic texture of an application, determine a texture based on a thematic texture of an application, and/or assign the determined texture to a region of a graphical keyboard in response to different events. For instance, in some examples, texture module 232 determines the thematic texture of the application, determines a texture based on a thematic texture of an application, and/or assigns the determined texture to a region of a graphical keyboard when the application is installed or updated on computing device 210. In some examples, texture module 232 determines the thematic texture of the application, determines a texture based on a thematic texture of an application, and/or assigns the determined texture to a region in a graphical keyboard when the application invokes texture module 232.

In some examples, texture module 232 may set a transparency effect for rendering color values of pixels corresponding to a region of a graphical keyboard to which a particular texture has been assigned. For example, the region of the graphical keyboard may include non-symbol portions in graphical keys of the graphical keyboard. In this example, the graphical keyboard includes a background region of the graphical keyboard may have a pattern of one or more colors. In this example, when rendering color value of pixels corresponding to the non-symbol portions of the graphical keys when a transparency effect is set, a device, such as computing device 210, may blend color value(s) of the thematic texture of an application with color values of co-located pixels corresponding to the background region to determine color values to assign to pixels corresponding to the non-symbol portions in the graphical keys. In this way, the computing device may assign color values to the pixels corresponding to the non-symbol portions of the graphical keys such that the graphical keys appear to be semi-transparent layers over the background region of the graphical keyboard.

In some examples, there may be insufficient contrast between color values of the thematic texture of an application and color values of regions of the graphical keyboard that are not assigned based on the thematic texture of the application. If insufficient contrast is present, a user may not be able to easily differentiate the regions of the graphical keyboard whose texture is assigned based on the thematic texture of the application from regions of the graphical keyboard whose textures are not assigned based on the thematic texture of the application. For example, if the symbol portions of graphical keys are always black, the thematic texture of the application consists of a dark gray color, and texture module 232 assigns the dark gray color of the thematic texture of the application to the non-symbol portions of the graphical keys, there may be insufficient contrast between the textures to allow the user to easily read the symbols in the graphical keys.

Accordingly, texture module 232 may determine, based at least in part on a thematic texture of an application, a texture such that there is sufficient contrast between regions of the graphical keyboard to which the determined texture is assigned and textures of regions of the graphical keyboard not assigned based on the thematic texture of the application. For instance, texture module 232 may determine, based at least in part on a thematic texture of an application, a texture such that a metric of a contrast between regions of the graphical keyboard to which the determined texture is assigned and textures of regions in the graphical keyboard not assigned based on the thematic texture of the application is greater than a particular threshold level. For example, if the symbol portions of graphical keys are always black and the thematic texture of the application consists of a dark gray color, texture module 232 may determine a texture consisting of a light gray color and assign the determined texture to the non-symbol portions of the graphical keys. Thus, texture module 232 may determine the texture to assign to a region (e.g., the non-symbol portions or the symbol portions) of the graphical keyboard such that a contrast level between the non-symbol portions and the symbol portions of each respective graphical keys is greater than a threshold level. The contrast level may be a luminance difference divided by an average luminance, a Weber contrast, a Michelson contrast, Root Means Square (RMS) contrast, or another type of contrast measurement or metric.

In some examples, texture module 232 may determine textures to assign to a region of a graphical keyboard from the same color family as color value(s) of the thematic texture. For instance, if the thematic texture is a particular shade of pink, texture module 232 may determine a color value of the texture to be a different shade of pink having greater contrast between the textures of the symbol portions and the textures of the non-symbol portions of the graphical key.

In some examples, an application may be associated with multiple thematic textures, which, in some examples, may be specified in a configuration file associated with the application. In at least some such examples, texture module 232 may assign, based at least in part on respective thematic textures of the application, textures to different respective regions of a graphical keyboard. For instance, texture module 232 may determine, based at least in part on a first thematic texture of the application, a first texture. Texture module 232 may assign the first texture to a background region of the graphical keyboard. Furthermore, texture module 232 may determine, based at least in part on a second thematic texture of the application, a second texture. Texture module 232 may assign the second texture to non-symbol portions of graphical keys of the same graphical keyboard.

In some examples, the state of the thematic texture may change from a first state to a second state (dynamic texture assignment). For example, a button of an application user interface may have a first texture when user interaction with that button is not sensed and a second texture while user interaction with that button is sensed. Texture module 232 may determine, again from data files associated with an application module 224, that such a thematic texture change occurs, and assign similar behavior to elements of the keyboard user interface.

Figure 3:
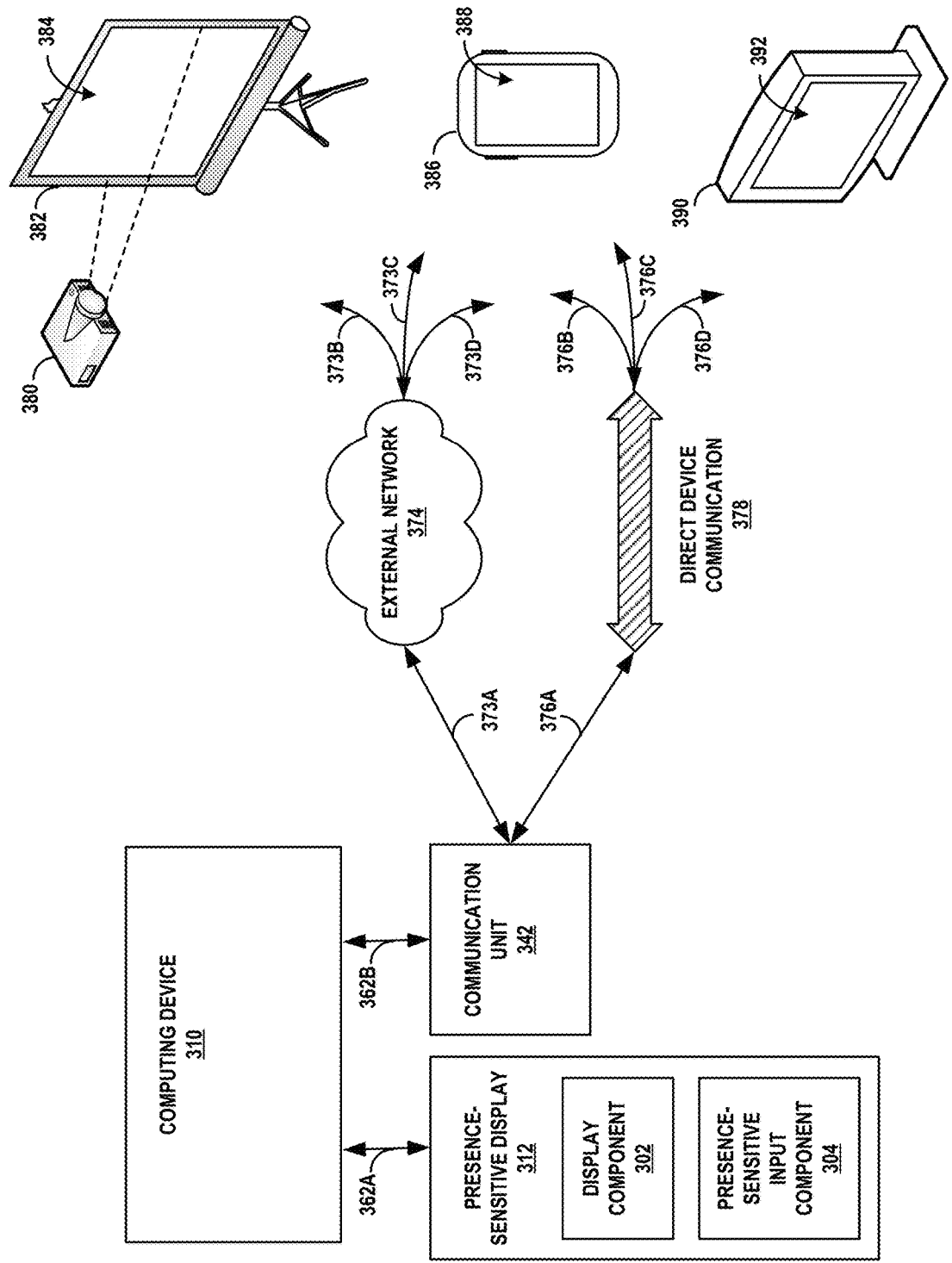
FIG. 3 is a block diagram illustrating an example computing device that outputs graphical content for display at a remote device, in accordance with one or more techniques of the present disclosure.

FIG. 3 is a block diagram illustrating an example computing device that outputs graphical content for display at a remote device, in accordance with one or more techniques of the present disclosure. Graphical content, generally, may include any visual information that may be output for display, such as text, images, a group of moving images, to name only a few examples. The example shown in FIG. 3 includes a computing device 310, a PSD 312, communication unit 342, projector 380, projector screen 382, mobile device 386, and visual display component 390. In some examples, PSD 312 may be a presence-sensitive display as described in FIGS. 1-2. Although shown for purposes of example in FIGS. 1 and 2 as a stand-alone computing device 110, a computing device such as computing device 310 may, generally, be any component or system that includes a processor or other suitable computing environment for executing software instructions and, for example, need not include a presence-sensitive display.

As shown in the example of FIG. 3, computing device 310 may be a processor that includes functionality as described with respect to processors 240 in FIG. 2. In such examples, computing device 310 may be operatively coupled to PSD 312 by a communication channel 362A, which may be a system bus or other suitable connection. Computing device 310 may also be operatively coupled to communication unit 342, further described below, by a communication channel 362B, which may also be a system bus or other suitable connection. Although shown separately as an example in FIG. 3, computing device 310 may be operatively coupled to PSD 312 and communication unit 342 by any number of one or more communication channels.

In other examples, such as illustrated previously by computing device 110 in FIGS. 1-2, a computing device may refer to a portable or mobile device such as mobile phones (including smart phones), laptop computers, etc. In some examples, a computing device may be a desktop computer, tablet computer, smart television platform, camera, personal digital assistant (PDA), server, or mainframes.

PSD 312 may include display component 302 and presence-sensitive input component 304. Display component 302 may, for example, receive data from computing device 310 and display the graphical content. In some examples, presence-sensitive input component 304 may determine one or more user inputs (e.g., continuous gestures, multi-touch gestures, single-touch gestures) at PSD 312 using capacitive, inductive, and/or optical recognition techniques and send indications of such user input to computing device 310 using communication channel 362A. In some examples, presence-sensitive input component 304 may be physically positioned on top of display component 302 such that, when a user positions an input unit over a graphical element displayed by display component 302, the location at which presence-sensitive input component 304 corresponds to the location of display component 302 at which the graphical element is displayed.

As shown in FIG. 3, computing device 310 may also include and/or be operatively coupled with communication unit 342. Communication unit 342 may include functionality of communication unit 242 as described in FIG. 2. Examples of communication unit 342 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 310 may also include and/or be operatively coupled with one or more other devices (e.g., input devices, output components, memory, storage devices) that are not shown in FIG. 3 for purposes of brevity and illustration.

FIG. 3 also illustrates a projector 380 and projector screen 382. Other such examples of projection devices may include electronic whiteboards, holographic display components, and any other suitable devices for displaying graphical content. Projector 380 and projector screen 382 may include one or more communication units that enable the respective devices to communicate with computing device 310. In some examples, the one or more communication units may enable communication between projector 380 and projector screen 382. Projector 380 may receive data from computing device 310 that includes graphical content. Projector 380, in response to receiving the data, may project the graphical content onto projector screen 382. In some examples, projector 380 may determine one or more user inputs (e.g., continuous gestures, multi-touch gestures, single-touch gestures) at projector screen using optical recognition or other suitable techniques and send indications of such user input using one or more communication units to computing device 310. In such examples, projector screen 382 may be unnecessary, and projector 380 may project graphical content on any suitable medium and detect one or more user inputs using optical recognition or other such suitable techniques.

Projector screen 382, in some examples, may include a presence-sensitive display 384. Presence-sensitive display 384 may include a subset of functionality or all of the functionality of presence-sensitive display 112 and/or 312 as described in this disclosure. In some examples, presence-sensitive display 384 may include additional functionality. Projector screen 382 (e.g., an electronic whiteboard), may receive data from computing device 310 and display the graphical content. In some examples, presence-sensitive display 384 may determine one or more user inputs (e.g., continuous gestures, multi-touch gestures, single-touch gestures) at projector screen 382 using capacitive, inductive, and/or optical recognition techniques and send indications of such user input using one or more communication units to computing device 310.

FIG. 3 also illustrates mobile device 386 and visual display component 390. Mobile device 386 and visual display component 390 may each include computing and connectivity capabilities. Examples of mobile device 386 may include e-reader devices, convertible notebook devices, hybrid slate devices, etc. Examples of visual display component 390 may include other devices such as televisions, computer monitors, etc. In some examples, visual display component 390 may be a vehicle cockpit display or navigation display (e.g., in an automobile, aircraft, or some other vehicle). In some examples, visual display component 390 may be a home automation display or some other type of display that is separate from computing device 310.

As shown in FIG. 3, mobile device 386 may include a presence-sensitive display 388. Visual display component 390 may include a presence-sensitive display 392. Presence-sensitive displays 388, 392 may include a subset of functionality or all of the functionality of presence-sensitive display 112, 212, and/or 312 as described in this disclosure. In some examples, presence-sensitive displays 388, 392 may include additional functionality. In any case, presence-sensitive display 392, for example, may receive data from computing device 310 and display the graphical content. In some examples, presence-sensitive display 392 may determine one or more user inputs (e.g., continuous gestures, multi-touch gestures, single-touch gestures) at projector screen using capacitive, inductive, and/or optical recognition techniques and send indications of such user input using one or more communication units to computing device 310.

As described above, in some examples, computing device 310 may output graphical content for display at PSD 312 that is coupled to computing device 310 by a system bus or other suitable communication channel. Computing device 310 may also output graphical content for display at one or more remote devices, such as projector 380, projector screen 382, mobile device 386, and visual display component 390. For instance, computing device 310 may execute one or more instructions to generate and/or modify graphical content in accordance with techniques of the present disclosure. Computing device 310 may output the data that includes the graphical content to a communication unit of computing device 310, such as communication unit 342. Communication unit 342 may send the data to one or more of the remote devices, such as projector 380, projector screen 382, mobile device 386, and/or visual display component 390. In this way, computing device 310 may output the graphical content for display at one or more of the remote devices. In some examples, one or more of the remote devices may output the graphical content at a presence-sensitive display that is included in and/or operatively coupled to the respective remote devices.

In some examples, computing device 310 may not output graphical content at PSD 312 that is operatively coupled to computing device 310. In other examples, computing device 310 may output graphical content for display at both a PSD 312 that is coupled to computing device 310 by communication channel 362A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 310 and output for display at PSD 312 may be different than graphical content display output for display at one or more remote devices.

Computing device 310 may send and receive data using any suitable communication techniques. For example, computing device 310 may be operatively coupled to external network 374 using network link 373A. Each of the remote devices illustrated in FIG. 3 may be operatively coupled to network external network 374 by one of respective network links 373B, 373C, or 373D. External network 374 may include network hubs, network switches, network routers, etc., that are operatively inter-coupled thereby providing for the exchange of information between computing device 310 and the remote devices illustrated in FIG. 3. In some examples, network links 373A-373D may be Ethernet, ATM or other network connections. Such connections may be wireless and/or wired connections.

In some examples, computing device 310 may be operatively coupled to one or more of the remote devices included in FIG. 3 using direct device communication 378. Direct device communication 378 may include communications through which computing device 310 sends and receives data directly with a remote device, using wired or wireless communication. That is, in some examples of direct device communication 378, data sent by computing device 310 may not be forwarded by one or more additional devices before being received at the remote device, and vice-versa. Examples of direct device communication 378 may include Bluetooth, Near-Field Communication, Universal Serial Bus, WiFi, infrared, etc. One or more of the remote devices illustrated in FIG. 3 may be operatively coupled with computing device 310 by communication links 376A-376D. In some examples, communication links 376A-376D may be connections using Bluetooth, Near-Field Communication, Universal Serial Bus, infrared, etc. Such connections may be wireless and/or wired connections.

In accordance with techniques of the disclosure, computing device 310 may be operatively coupled to visual display component 390 using external network 374. Computing device 310 may output a graphical keyboard for display at PSD 312. For instance, computing device 310 may send (i.e., signal) data that includes a representation of the graphical keyboard to communication unit 342. For example, in accordance with a technique of this disclosure, computing device 310 may use a first application (e.g., keyboard module) to determine a thematic texture of a second application. Additionally, in this example, computing device 210 may use the first application to determine, based at least in part on the thematic texture of the second application, a first texture. In this example, computing device 210 may use the first application to assign the first texture to a region of a first graphical keyboard. In this example, computing device 310 may reuse the same first application to determine a thematic texture of a third application and determine, based at least in part on a thematic texture of the third application, a second texture. In this example, computing device 210 may use the first application to assign the second texture to a region of a second graphical keyboard. Furthermore, in this example, computing device 310 may signal a representation of the first graphical keyboard for concurrent display with a graphical user interface of the second application. In this example, computing device 310 may subsequently signal a representation of the second graphical keyboard for concurrent display with a graphical user interface of the third application. In this way, when displayed, the region of the first graphical keyboard has the first texture and the region of the second graphical keyboard has the second texture. Communication unit 342 may send the data that includes the representation of the graphical keyboard to visual display component 390 using external network 374. Visual display component 390, in response to receiving the data using external network 374, may cause PSD 312 to output the graphical keyboard. In response to receiving a user input at PSD 312 to select one or more keys of the graphical keyboard, visual display component 390 may send an indication of the user input to computing device 310 using external network 374. Communication unit 342 of may receive the indication of the user input, and may send the indication to computing device 310.

Computing device 310 may select, based on the user input, one or more keys. Computing device 310 may determine, based on the initial selection of one or more keys, one or more candidate words. In some examples, computing device 310 may determine, based at least in part on the one or more candidate words, a probability of a particular key being selected after the initial selection of one or more keys. Responsive to determining that the probability does not satisfy a probability threshold, computing device 310 may output a representation of an updated graphical user interface including an updated graphical keyboard. The updated graphical keyboard may include a graphical indication designating the particular key as an additional key for selecting a character associated with an adjacent key. Communication unit 342 may receive the representation of the updated graphical user interface and may send the send the representation to visual display component 390, such that visual display component 390 may cause PSD 312 to output the updated graphical keyboard, including the graphical indication designating the particular key as an additional key for selecting the adjacent key.

Figure 4:
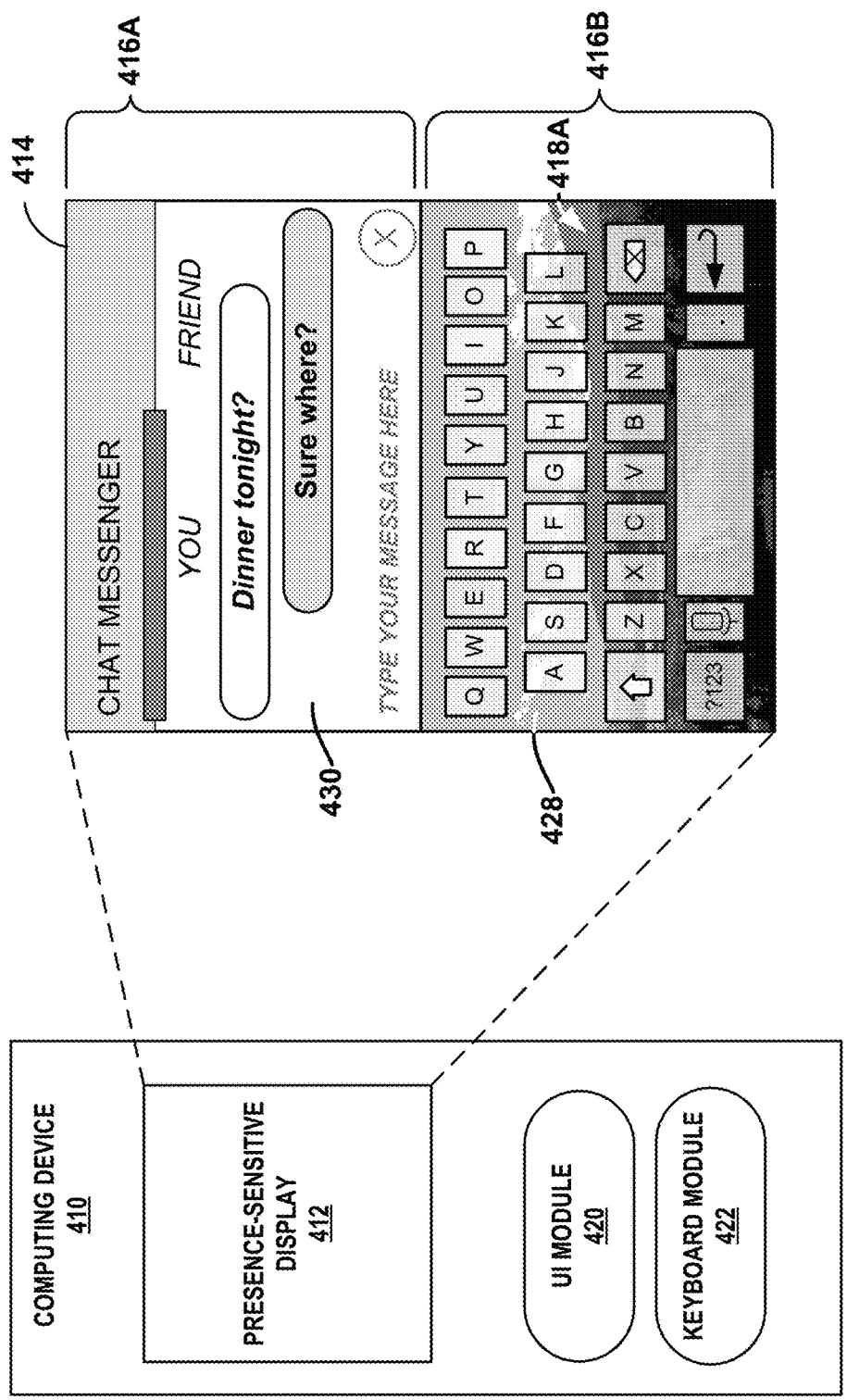
FIG. 4 is a conceptual diagram illustrating an example graphical user interface of an example computing device that is configured to present a graphical keyboard with a background region showing an image.
Figure 5:
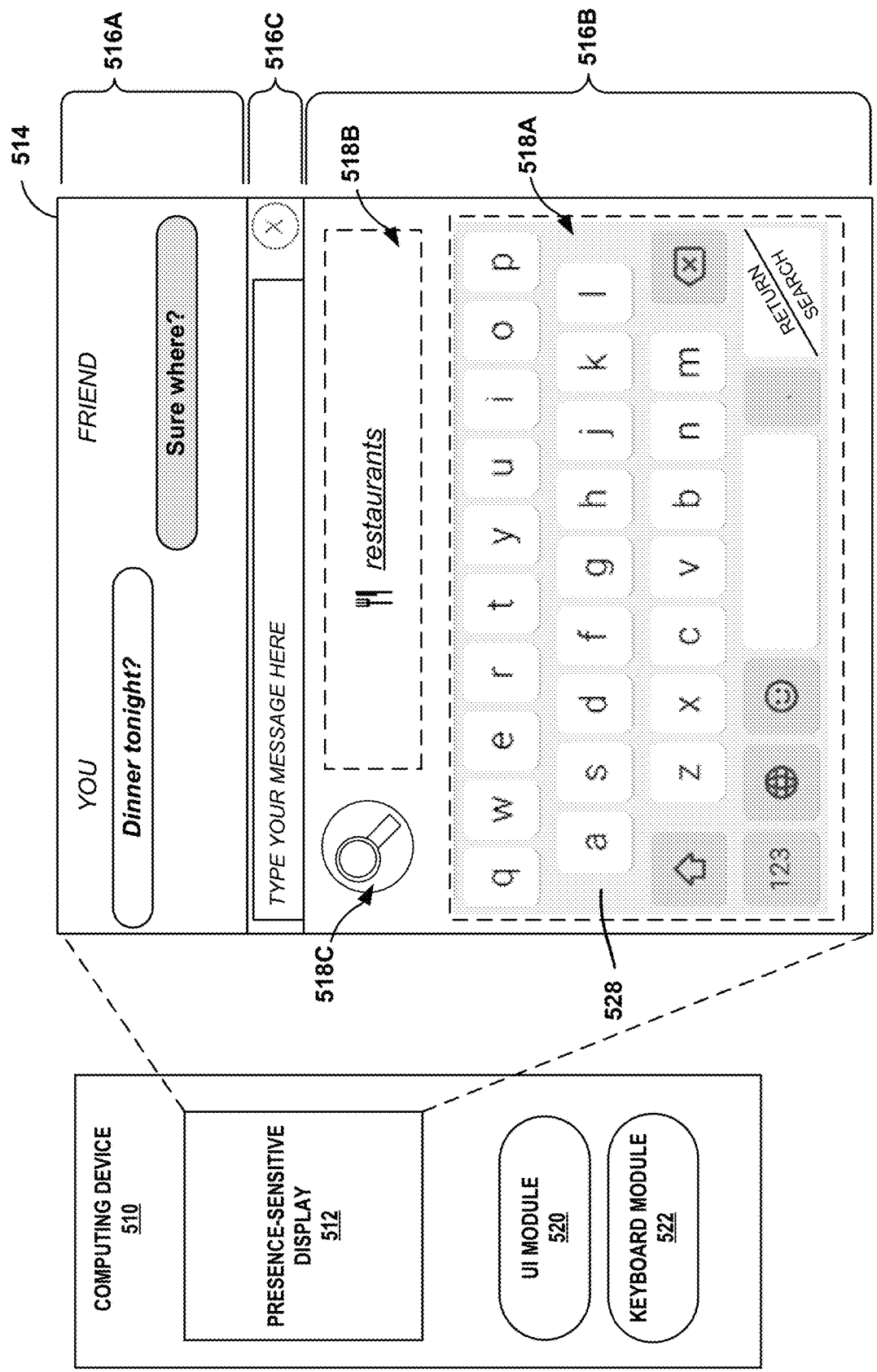
FIG. 5 is a conceptual diagram illustrating an example graphical user interface of an example computing device that is configured to present a graphical keyboard with integrated search features.

FIGS. 4 and 5 are conceptual diagrams illustrating example graphical user interfaces of an example computing device that is configured to present a graphical keyboard, in accordance with one or more aspects of the present disclosure. FIGS. 4 and 5 illustrate, respectively, example graphical user interfaces 414 and 514. However, many other examples of graphical user interfaces may be used in other instances. Each of graphical user interfaces 414, 514 may correspond to a graphical user interface displayed by computing devices 110 or 210 of FIGS. 1 and 2 respectively. FIGS. 4 and 5 are described below in the context of computing devices 410 and 510, respectively. Computing device 410, 510 may include presence-sensitive displays 412, 512, UI modules 420, 520, and keyboard modules 422, 522, respectively, which may have similar functionality to presence-sensitive displays 110, 210, 312, UI modules 120, 220, and keyboard modules 122, 222.

FIG. 4 is a conceptual diagram illustrating an example graphical user interface of an example computing device 410 that is configured to present a graphical keyboard 416B with a background region showing an image. In the example of FIG. 4, user interface 414 comprises output region 416A (that may be generated by, under control of, or comprise the user interface for a first application, such as a chat application) and graphical keyboard 416B (that may be generated by, under control of, or comprise the user interface for keyboard module 422, separate from the first application). Graphical keyboard 416B includes a plurality of graphical keys 418A and a background region 428 that surrounds graphical keys 418A. As indicated in the example of FIG. 4, background region 428 comprises a picture. Computing device 110 may receive an indication of user input to select the picture for display in background region 428 of graphical keyboard 416B. In some examples, computing device 110 may receive indications of user input to select different pictures to display in background region 428 of graphical keyboard 416B for different applications. In other examples, the image may be specified by an application (e.g., in a configuration file of the application). For instance, in some examples, the image may comprise an image in a background region 430 of the application's user interface 416A.

In the example of FIG. 4, graphical keys 418A are semi-transparent such that the picture can be partially seen through graphical keys 418A. In other examples, graphical keys 418A are completely transparent. In other examples, graphical keys 418A are opaque such that no portion of the picture can be seen through graphical keys 418A. In some examples, the transparency forms an aspect of thematic texture that can be assigned based on the thematic texture of a separate application, such as that providing output region 416A.

In accordance with a technique of this disclosure, keyboard module 422 may determine, based at least in part on a thematic texture of an application whose graphical user interface is to be displayed at presence-sensitive display 412 concurrent with graphical keyboard 416B, a texture to assign to a region of graphical keyboard 416B. For instance, keyboard module 422 may assign the texture to symbol or non-symbol portions of graphical keys 418A, or border markers of graphical keys 418A.

FIG. 5 is a conceptual diagram illustrating an example graphical user interface of an example computing device 510 that is configured to present a graphical keyboard 516B with integrated search features. Like the graphical keyboards described elsewhere in this disclosure, keyboard module 522 may determine, based at least in part on a thematic texture of an application whose graphical user interface is to be displayed at presence-sensitive display 512 concurrent with graphical keyboard 516B, a texture to assign to a region of graphical keyboard 516B. For example, keyboard module 522 may assign the texture to a background region 528 of graphical keyboard 516B. In another example, keyboard module 522 may assign the texture to symbol or non-symbol portions of graphical keys 518A of graphical keyboard 516B.

In the example of FIG. 5, user interface 514 includes output region 516A, graphical keyboard 516B, and edit region 516C. Output region 516A is the graphical user interface of an application. A user of computing device 510 may provide input at graphical keyboard 516B to produce textual characters within edit region 516C that form the content of the electronic messages displayed within output region 516A. The messages displayed within output region 516A may form a chat conversation between a user of computing device 510 and a user of a different computing device. Graphical keyboard 516B includes graphical elements displayed as graphical keys 518A.

Figure 6:
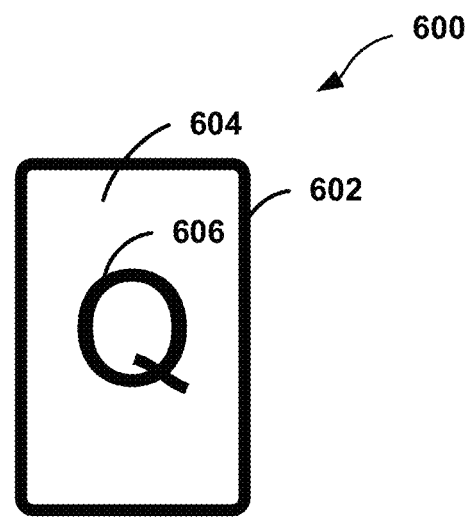
FIG. 6 is a conceptual diagram illustrating an example graphical key of a graphical keyboard.

FIG. 6 is a conceptual diagram illustrating an example graphical key 600. Graphical key 600 may be among graphical keys 118A, 118B, 418A, and 518A in FIGS. 1, 4, and 5. In the example of FIG. 6, graphical key 600 includes border markers 602, non-symbol portion 604, and symbol portion 606. Symbol portion 606 is colored to indicate a symbol (e.g., "Q" in the example of FIG. 6) included in graphical key 600. In some examples, a computing device (e.g., computing device 110, 210, 310, 410, 510) may assign a texture to border markers 602. In some examples, a computing device (e.g., computing device 110, 210, 310, 410, 510) may assign a texture to non-symbol portion 604. In some examples, a computing device (e.g., computing device 110, 210, 310, 410, 510) may assign a texture to symbol portion 606. In some examples, a computing device (e.g., computing device 110, 210, 310, 410, 510) may the texture assigned may include specification of a font type, style, size, or other feature for symbol portion 606. In each of these examples, the computing device may determine the texture from a texture used by a separate (first) application that utilizes the resources of the graphical keyboard for key 600.

Figure 7:
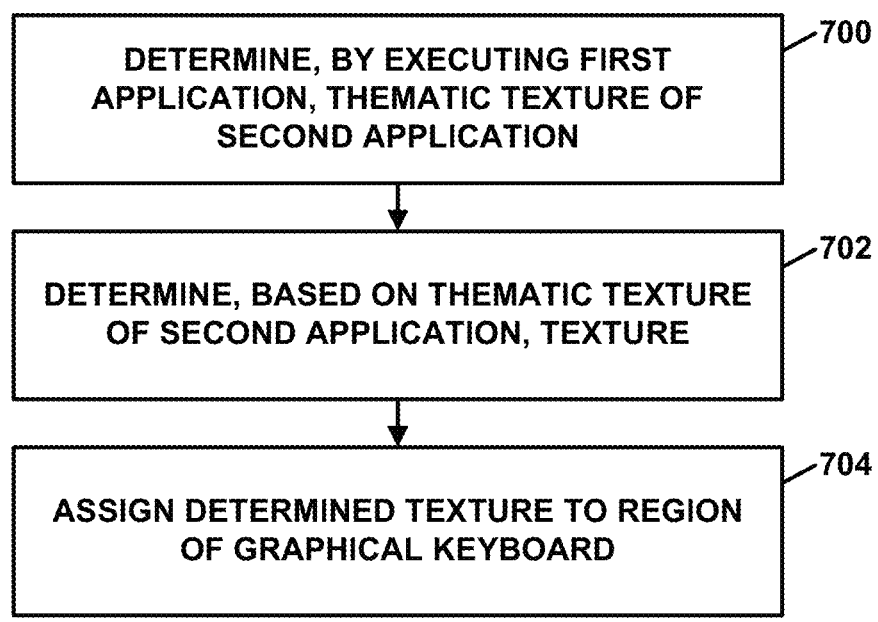
FIG. 7 is a flowchart illustrating example operations of a computing device that is configured to output at least one graphical keyboard for display, in accordance with one or more aspects of the present disclosure.

FIG. 7 is a flowchart illustrating example operations of a computing device that is configured to output a graphical keyboard for display, in accordance with one or more aspects of the present disclosure. The operations of FIG. 7 may be performed by one or more processors of a computing device, such as computing devices 110, 210, 310, 410, 510, or another computing device.

In the example of FIG. 7, a computing device (e.g., computing devices 110, 210, 310, 410, 510) determines, by executing a first application (e.g., keyboard module 122, 222, 422, 522), a thematic texture of a second application separate from the first application (700). Additionally, the computing device may determine, by executing the first application and based at least in part on the thematic texture of the second application, a texture (702). The computing device may assign, by executing the first application, the determined texture to a region of a graphical keyboard (704).

Although not illustrated in the example of FIG. 7, the determined texture may be a first determined texture and the computing device may further determine, by executing the first application, a thematic texture of a third application. The third application is a different application from the first application and the second application. Additionally, the computing device may determine, by executing the first application and based at least in part on the thematic texture of the third application, a second texture. The computing device may assign, by executing the first application, the second texture to a region of a second graphical keyboard. In this example, the first graphical keyboard and the second graphical keyboard may have the same layout (e.g., same arrangement of graphical keys) or different layouts (e.g., different arrangement of graphical keys, different graphical keys). In some examples, the region of the first graphical keyboard and the region of the second graphical keyboard are the same region of the first and second graphical keyboards or different regions of the first and second graphical keyboards.

In some examples, subsequent to and/or responsive to assigning the first texture to the region of the first graphical keyboard, the computing device outputs, for concurrent display at a presence-sensitive display (e.g., PSD 112, 212, 312, 412, 512), the first graphical keyboard and a graphical user interface of the first application. Additionally, subsequent to and/or responsive to assigning the second texture to the region of the second graphical keyboard, the computing device may output, for concurrent display at the presence-sensitive display (e.g., PSD 112, 212, 312, 412, 512) in place of the first graphical keyboard and the graphical user interface of the first application, the second graphical keyboard and a graphical user interface of the second application.

In other examples, the computing device is a first computing device and, subsequent to and/or responsive to assigning the first texture to the region of the first graphical keyboard, the first computing device signals to a second computing device (e.g., mobile device 386, visual display component 390) a representation of the first graphical keyboard for concurrent display (e.g., by PSD 384, 388, PSD 392) with a graphical user interface of the first application. Additionally, subsequent to and/or responsive to assigning the first texture to the region of the first graphical keyboard, the computing device may signal to the second computing device a representation of the second graphical keyboard for concurrent display with a graphical user interface of the second application. The representations of the first and second graphical keyboards may be encoded in an image format, such as a bitmap format, a JPEG format, a GIF format, or another type of image format.

The following numbered clauses may illustrate one or more aspects of the disclosure:

Clause 1. A method comprising: determining, by a computing device executing a first application, a thematic texture of a second application separate from the first application; determining, by the computing device executing the first application and based at least in part on the thematic texture of the second application, a texture; and assigning, by the computing device executing the first application, the determined texture to a region of a graphical keyboard.

Clause 2. The method of clause 1, further comprising: subsequent to assigning the determined texture to the region of the graphical keyboard, outputting, by the computing device and for concurrent display at a presence-sensitive display, the graphical keyboard and a graphical user interface of the second application.

Clause 3. The method of any of clauses 1-2, wherein the computing device is a first computing device, the method further comprising: subsequent to assigning the determined texture to the region of the first graphical keyboard, signaling, by the first computing device and to a second computing device, a representation of the graphical keyboard for concurrent display with a graphical user interface of the second application.

Clause 4. The method of any of clauses 1-3, wherein the texture is a first texture and the graphical keyboard is a first graphical keyboard, the method further comprising: determining, by the computing device executing the first application, a thematic texture of a third application, the third application being different from the first application and the second application; determining, by the computing device executing the first application and based at least in part on the thematic texture of the third application, a second texture; assigning, by the computing device executing the first application, the second texture to a region of a second graphical keyboard; and performing one of: subsequent to assigning the second texture to the region of the second graphical keyboard, outputting, by the computing device and for concurrent display at the presence-sensitive display in place of the first graphical keyboard and the graphical user interface of the second application, the second graphical keyboard and a graphical user interface of the third application; or subsequent to assigning the second texture to the region of the second graphical keyboard, signaling, by the first computing device and to the second computing device, the representation of the second graphical keyboard for concurrent display with the graphical user interface of the third application.

Clause 5. The method of any of clauses 1-4, wherein the graphical keyboard comprises a plurality of graphical keys and a background region surrounding the plurality of graphical keys, wherein each respective graphical key of the plurality of graphical keys includes a respective symbol, and wherein the region of the graphical keyboard comprises the background region of the graphical keyboard.

Clause 6. The method of any of clauses 1-5, wherein the graphical keyboard comprises a plurality of graphical keys, wherein each respective graphical key of the plurality of graphical keys includes respective non-symbol portions and respective symbol portions colored to indicate a respective symbol for the respective graphical key, and wherein the region of the graphical keyboard comprises the non-symbol portions of one or more of the graphical keys.

Clause 7. The method of any of clauses 1-6, wherein the graphical keyboard comprises a plurality of graphical keys, wherein each respective graphical key of the plurality of graphical keys includes respective non-symbol portions and respective symbol portions colored to indicate a respective symbol for the respective graphical key, and wherein the region of the graphical keyboard comprises the symbol portions of one or more of the graphical keys.

Clause 8. The method of any of clauses 1-7, wherein the graphical keyboard comprises a plurality of graphical keys, wherein each respective graphical key is enclosed by a respective set of border markers, and wherein the region of the graphical keyboard comprises the border markers enclosing one or more of the graphical keys.

Clause 9. The method of any of clauses 1-8, wherein the graphical keyboard comprises a plurality of graphical keys, wherein each respective graphical key of the plurality of graphical keys includes respective non-symbol portions and respective symbol portions colored to indicate a respective symbol for the respective graphical key, wherein the region of the graphical keyboard comprises either the respective non-symbol portions or the respective symbol portions of each respective graphical key, and wherein determining the texture comprises: determining, by the computing device executing the first application, the texture such that a contrast level between the non-symbol portions and the symbol portions of each respective graphical key of the plurality of graphical keys is greater than a threshold level.

Clause 10. The method of any of clauses 1-9, wherein the thematic texture of the second application consists of a particular color value, and wherein assigning the determined texture to the region of the graphical keyboard comprises assigning, by the computing device executing the first application, the particular color value to the region of the graphical keyboard.

Clause 11. The method of any of clauses 1-10, wherein determining the thematic texture of the second application comprises determining, by the computing device executing the first application, based on data in a file associated with the second application, the thematic texture of the second application.

Clause 12. The method of any of clauses 1-11, wherein the first application is an application invoked by the second application.

Clause 13. A computing device comprising: a presence-sensitive display; at least one processor; and a memory comprising instructions of a first application that, when executed by the at least one processor, cause the at least one processor to: determine a thematic texture of a second application separate from the first application; determine, based at least in part on the thematic texture of the second application, a texture; and assign the determined texture to a region of a graphical keyboard.

Clause 14. The computing device of clause 13, wherein the instructions, when executed by the at least one processor, cause the at least one processor to: subsequent to assigning the determined texture to the region of the graphical keyboard, output, for concurrent display at the presence-sensitive display, the graphical keyboard and a graphical user interface of the second application.

Clause 15. The computing device of any of clauses 13-14, wherein the second application is locally executed by the computing device.

Clause 16. The computing device of any of clauses 13-15, wherein the second application is a web application.

Clause 17. The computing device of clause 16, wherein the instructions, when executed by the at least one processor, cause the at least one processor to determine the thematic texture of the web application from a style sheet referenced by a web page of the web application.

Clause 18. The computing device of any of clauses 13-17, wherein the graphical keyboard comprises a plurality of graphical keys and a background region surrounding the plurality of graphical keys, wherein each respective graphical key of the plurality of graphical keys includes a respective symbol, and wherein the region of the graphical keyboard comprises at least one of: the background region of the graphical keyboard, non-symbol portions of the graphical keys, or symbol portions of the graphical keys.

Clause 19. A computer-readable storage medium encoded with instructions of a first application that, when executed by at least one processor of a computing device, cause the at least one processor to: determine a thematic texture of a second application separate from the first application; determine, based at least in part on the thematic texture of the second application, a texture; assign the determined texture to a region of a graphical keyboard; and output, for concurrent display at a presence-sensitive display, the graphical keyboard and a graphical user interface of the second application.

Clause 20. The computer-readable storage medium of clause 19, wherein the graphical keyboard comprises a plurality of graphical keys and a background region surrounding the plurality of graphical keys, wherein each respective graphical key of the plurality of graphical keys includes a respective symbol, wherein the region of the graphical keyboard comprises: the background region, non-symbol portions of the plurality of graphical keys, and symbol portions of the plurality of graphical keys.

Clause 21. A system comprising means for performing any of the methods of clauses 1-12.

Clause 22. A computing device comprising means for performing any of the methods of clauses 1-12.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
    invoking, by an operating platform executed by a computing device and responsive to the operating platform determining that graphical keyboard input functionality is requested, a first application separate from the operating platform;
    determining, by the computing device executing the first application, a thematic texture of a second application separate from the first application;
    determining, by the computing device executing the first application and based at least in part on the thematic texture of the second application, a texture; and
    assigning, by the computing device executing the first application, the determined texture to a region of a graphical keyboard,
    wherein the graphical keyboard comprises a plurality of graphical keys,
    wherein each respective graphical key of the plurality of graphical keys includes respective non-symbol portions and respective symbol portions colored to indicate a respective symbol for the respective graphical key,
    wherein the region of the graphical keyboard comprises either the respective non-symbol portions or the respective symbol portions of each respective graphical key, and
    wherein determining the texture comprises determining, by the computing device executing the first application, the texture such that a contrast level between the non-symbol portions and the symbol portions of each respective graphical key of the plurality of graphical keys is greater than a threshold level.

2. The method of claim 1, further comprising:
    subsequent to assigning the determined texture to the region of the graphical keyboard, outputting, by the computing device and for concurrent display at a presence-sensitive display, the graphical keyboard and a graphical user interface of the second application.

3. The method of claim 1, wherein the computing device is a first computing device, the method further comprising:
    subsequent to assigning the determined texture to the region of the first graphical keyboard, signaling, by the first computing device and to a second computing device, a representation of the graphical keyboard for concurrent display with a graphical user interface of the second application.

4. The method of claim 3, wherein the texture is a first texture and the graphical keyboard is a first graphical keyboard, the method further comprising:
    determining, by the first computing device executing the first application, a thematic texture of a third application, the third application being different from the first application and the second application;
    determining, by the first computing device executing the first application and based at least in part on the thematic texture of the third application, a second texture;
    assigning, by the first computing device executing the first application, the second texture to a region of a second graphical keyboard; and
    performing one of:
        subsequent to assigning the second texture to the region of the second graphical keyboard, outputting, by the first computing device and for concurrent display at a presence-sensitive display in place of the first graphical keyboard and the graphical user interface of the second application, the second graphical keyboard and a graphical user interface of the third application; or
        subsequent to assigning the second texture to the region of the second graphical keyboard, signaling, by the first computing device and to the second computing device, the representation of the second graphical keyboard for concurrent display with the graphical user interface of the third application.

5. The method of claim 1,
wherein the graphical keyboard further comprises a background region surrounding the plurality of graphical keys, and
wherein the region of the graphical keyboard comprises the background region of the graphical keyboard.

6. The method of claim 1,
wherein each respective graphical key is enclosed by a respective set of border markers, and
wherein the region of the graphical keyboard further comprises the border markers enclosing one or more of the graphical keys.

7. The method of claim 1, wherein the thematic texture of the second application consists of a particular color value, and wherein assigning the determined texture to the region of the graphical keyboard comprises assigning, by the computing device executing the first application, the particular color value to the region of the graphical keyboard.

8. The method of claim 1, wherein determining the thematic texture of the second application comprises determining, by the computing device executing the first application, based on data in a file associated with the second application, the thematic texture of the second application.

9. The method of claim 1, wherein the first application is an application invoked by the second application.

10. A computing device comprising:
a presence-sensitive display;
at least one processor; and
a memory comprising instructions of an operating platform that, when executed by the at least one processor, cause the at least one processor to invoke, responsive to the operating platform determining that graphical keyboard input functionality is requested, a first application separate from the operating platform,
the memory further comprising instructions of the first application that, when executed by the at least one processor, cause the at least one processor to:
determine a thematic texture of a second application separate from the first application;
determine, based at least in part on the thematic texture of the second application, a texture; and
assign the determined texture to a region of a graphical keyboard,
wherein the graphical keyboard comprises a plurality of graphical keys,
wherein each respective graphical key of the plurality of graphical keys includes respective non-symbol portions and respective symbol portions colored to indicate a respective symbol for the respective graphical key,
wherein the region of the graphical keyboard comprises either the respective non-symbol portions or the respective symbol portions of each respective graphical key, and
wherein the instructions that, when executed, cause the at least one processor to determine the texture comprise instructions that, when executed, cause the at least one processor to determine the texture such that a contrast level between the non-symbol portions and the symbol portions of each respective graphical key of the plurality of graphical keys is greater than a threshold level.

11. The computing device of claim 10, wherein the instructions, when executed by the at least one processor, cause the at least one processor to:
subsequent to assigning the determined texture to the region of the graphical keyboard, output, for concurrent display at the presence-sensitive display, the graphical keyboard and a graphical user interface of the second application.

12. The computing device of claim 10, wherein the second application is locally executed by the computing device.

13. The computing device of claim 10, wherein the second application is a web application.

14. The computing device of claim 13, wherein the instructions, when executed by the at least one processor, cause the at least one processor to determine the thematic texture of the web application from a style sheet referenced by a web page of the web application.

15. A non-transitory computer-readable storage medium encoded with instructions of an operating platform and a first application,
the instructions of the operating platform that, when executed by at least one processor of a computing device, cause the at least one processor to invoke, responsive to the operating platform determining that graphical keyboard input functionality is requested, a first application separate from the operating platform, and
the instructions of the first application that, when executed by the at least one processor, cause the at least one processor to:
determine a thematic texture of a second application separate from the first application;
determine, based at least in part on the thematic texture of the second application, a texture;
assign the determined texture to a region of a graphical keyboard,
wherein the graphical keyboard comprises a plurality of graphical keys,
wherein each respective graphical key of the plurality of graphical keys includes respective non-symbol portions and respective symbol portions colored to indicate a respective symbol for the respective graphical key,
wherein the region of the graphical keyboard comprises either the respective non-symbol portions or the respective symbol portions of each respective graphical key, and
wherein the instructions that, when executed, cause the at least one processor to determine the texture comprise instructions that, when executed, cause the at least one processor to determine the texture such that a contrast level between the non-symbol portions and the symbol portions of each respective graphical key of the plurality of graphical keys is greater than a threshold level; and
output, for concurrent display at a presence-sensitive display, the graphical keyboard and a graphical user interface of the second application.

* * * * *